United States Patent [19]
Ishii et al.

[11] Patent Number: 6,028,585
[45] Date of Patent: Feb. 22, 2000

[54] SCREEN DISPLAY CONTROL METHOD AND A SCREEN DISPLAY CONTROL APPARATUS

[75] Inventors: Keita Ishii, Yokohama; Kenichi Kurumiya, Sagamihara; Tatsumi Nagasawa, Kawasaki, all of Japan

[73] Assignee: International Business Machines Corporation, Armonk, N.Y.

[21] Appl. No.: 08/676,583

[22] Filed: Jul. 1, 1996

[30] Foreign Application Priority Data

Sep. 22, 1995 [JP] Japan ...................................... 7-244664

[51] Int. Cl.⁷ ...................................................... B09G 5/14
[52] U.S. Cl. ................................ 345/132; 345/3; 345/127
[58] Field of Search ................................. 345/1, 3, 132; 348/445, 448, 458, 127

[56] References Cited

U.S. PATENT DOCUMENTS 5,532,716  7/1996  Sano ........................................ 345/132
5,612,715  3/1997  Karaki et al. ........................... 345/132

*Primary Examiner*—Dennis-Doon Chow
*Attorney, Agent, or Firm*—Daniel E. McConnell; Andrew J. Dillon; George E. Grosser

[57] ABSTRACT

An information handling apparatus and screen display control method for appropriately controlling a screen display when a changed output destination for a display signal is selected from among a plurality of display devices having different resolutions. The method, which switches a display signal output destination between a plurality of display devices connected to an information processing apparatus, has (a) a first resolution control step of examining a physical maximum resolution for each of the plurality of display devices that are connected to the information handling apparatus, and storing the examined physical maximum resolutions respectively; (b) a second resolution control step of determining a maximum resolution (maximum static resolution) that is used for the allocation of a screen buffer; (c) a selection step of designating one of the plurality of display devices as an display signal output destination in accordance with an instruction from a user; (d) a third resolution control step of determining a maximum resolution (maximum dynamic resolution) in accordance with a display ability of software for which a screen display is currently being performed; and (e) a resolution determination step of setting a physical resolution of the display device designated, at the step (c), as the display signal output destination, to a lower resolution of either the physical maximum resolution stored at the step (a) or the maximum dynamic resolution determined at the step (d).

4 Claims, 3 Drawing Sheets

SCREEN DISPLAY CONTROL METHOD AND A SCREEN DISPLAY CONTROL APPARATUS

BACKGROUND OF THE INVENTION

The present invention relates to a screen display control method for controlling a screen of a display device (e.g., a liquid crystal display or a CRT display) that is employed for various types of information processing apparatuses, such as personal computers, and to an apparatus therefor; and in particular to a screen display control method for appropriately controlling a display screen when a changed output destination for a display signal is selected from among a plurality of display devices having different resolutions, and to an apparatus therefor. More specifically, the present invention pertains to a screen display control method by which an information processing apparatus appropriately performs a screen display on a display device having any resolution, and to an apparatus therefor.

In accordance with current technical development, various information processing apparatuses, such as personal computers (PCs), graphic work stations, and word processors, are being developed and sold on the market.

Generally, such an information processing apparatus provides a working environment for an operator by outputting data, which were processed by a CPU (Central Processing Unit), to a screen of an attached display device. The display device can be a liquid crystal display (LCD), a CRT (Cathode Ray Tube) display, or a home television (TV) monitor. Although the resolution of the CRT display is excellent, it is heavy and not appropriate for carrying. While the LCD is made thin and light and is portable, its image quality is inferior to that of the CRT display. It is, therefore, common practice for desktop PCs to mount CRT displays as a standard and for notebook PCs to mount LCDs as a standard.

Data that are displayed on the screen of a display device are, for example, text, figures, and images. A software screen that is provided by a current high performance operating system, such as OS/2 ("OS/2" is a trademark of IBM Corp.) or Windows ("Windows" is a trademark of Microsoft Corp.), is a so-called window screen in a "bit map" display form wherein characters and figures are regarded as dot groups. The window screen is a screen on which various sentences and computer images for a plurality of applications are displayed in separate areas, and has high resolution of, for example, 1024×768 dots. In accordance with the continuing development of such display functions, a processing ability that can provide higher performance at a higher speed is required for hardware components, such as a CPU and a video adaptor that actually performs a drawing process. A frame buffer (VRAM) for temporarily storing drawing information must have a large memory capacity. Accordingly, a display device preferably has a high resolution.

Recent PCs not only mount a single display device as a standard, but also can accommodate a plurality of additional types of display devices. Most of the notebook PCs, that have LCD displays as a standard feature, also have output terminals to accommodate CRT displays so as to enable the selection of a proper output destination (e.g., the notebook PC "ThinkPad 755" series sold by IBM Japan, Ltd. ("ThinkPad" is a trademark of IBM Corp.)). Because of this, an employment environment appropriate for every condition is provided. The LCD screen is mounted on a PC, so that it is used outside an office or home, while an external display is connected to the PC so that a display having a high resolution can be employed when the PC is used at home or in the office. The latest multi-media PC mounts an output terminal for a TV monitor as a standard, and can select a home TV monitor as an output destination. There exist so many opportunities for the switching of display devices.

One of the problems encountered when a PC switches an output destination for a display signal arises as a result of a difference in resolution between display devices. For example, the resolution of a home TV monitor is 640×400 dots for an NTSC system, and 800×600 dots for a PAL system. The resolution of an LCD display varies depending on the screen size, and can be 640×480 dots, 800×600 dots, or 1024×768 dots. The resolution of a CRT display is relatively high, and generally is 1024×768 dots or 1280×1024 dots.

Generally, a peripheral device called a "video adaptor" controls the resolution of a display screen in accordance with system data determined in advance before the powering on of the system. More specifically, for the setup of a resolution, a POST (Power On Self Test) program that is executed at the time of activation refers to data in nonvolatile memory (e.g., a CMOS RAM) which is a storage area for resolution and other system data, and sets up a display controller in the video adaptor in accordance with ones of the system data. The system data in the CMOS RAM are commonly rewritable by a utility program, and can be updated when the system is rebooted. Such setup procedures for resolution are performed one time when the system is powered on, and a display output destination can not be dynamically switched while the system is in operation. It is because, in general, the setup procedure is static. If a user desires to change a resolution as he switches a display output destination from an LCD to a CRT display, or from a CRT display to an LCD, first, the user must execute a utility program to rewrite data in the CMOS RAM and thereafter must reboot the system. In short, the very troublesome job is required to change the display output destination.

When the output destination is dynamically changed while a resolution is fixed at a predetermined setup value, the following problems occur.

(1) Switching from a display device with high resolution to a display device with low resolution:

An LCD display controller and a CRT display controller for controlling the display for an LCD and a CRT display device, respectively, generate a sync signal to produce a display timing. In a situation where the output destination is a CRT display and the resolution is set at a high level of 1024×768, if the output destination is switched to an LCD having a lower resolution of 800×600, an LCD display controller can not produce the timing to offset the difference between these resolutions. Since an LCD has a digital display, the LCD display controller can merely send, unchanged, to an LCD a digital display signal that corresponds to digital image data written in a screen buffer. So long as a dedicated hardware component is not provided in addition to the LCD display controller, an operation such as the interlacing of some scan lines from digital image data, or the interpolation of pixel data can not be performed. In other words, the resolution for a digital image can not be manipulated by only using software. If a display signal is output with a high resolution that exceeds the physical capacity of an LCD, at the worst, the hardware might be damaged.

For this reason, the above mentioned ThinkPad 755 does not drive an LCD, and protects system hardware when a request for switching a display from a CRT display to an LCD is issued. In this case, if the CRT display is disengaged while data at a high resolution are being displayed on it, an output destination for display data substantially vanishes, even though an LCD is installed, and no data are displayed on any screen.

In other words, display data for a display device having a high resolution can not be dynamically switched to a display device having a low resolution.

(2) Switching from a display device with low resolution to a display device with high resolution:

It is possible to switch the output destination from an LCD to a CRT display because the CRT display has an analog display form and the interpolation of pixel data is easy. The CRT display controller simply adjusts display timing to display, on a screen, enlarged screen data at a resolution lower than the maximum resolution. However, on the display screen of the CRT display, data having a predetermined low resolution are merely enlarged and displayed at the full screen size, and the resolution can not be dynamically changed. As is mentioned above, the maximum resolution that is set to the video adaptor is fixed so long as the contents of the CMOS RAM are not rewritten and the device rebooted.

In other words, the display screen can not be dynamically changed from a low resolution to a high resolution.

(3) Switching display devices with the same resolution:

In this case, an output destination is changed from a CRT display to an LCD, or from an LCD to a CRT display, while a full screen session* is being opened. A "full screen" is a form where the entire screen is employed for a display for an application program on behalf of a window screen, even though the display environment is one in which a multi-window is available.

A full screen session is generally performed with a VGA compatible screen and has a relatively low resolution of 640×480. An LCD display controller and a CRT display controller can respectively drive an LCD and a CRT display in accordance with the requirements for a full screen session whose resolution is lower than the maximum resolution.

Normally, a full screen session is opened by a call initiated on a higher resolution software screen (e.g., a window screen), such as a Windows or OS/2 screen. When the full screen session is closed by entering "exit" at the DOS prompt, the display contents are returned to the original, high resolution window screen that is provided by Windows or OS/2. At this time, the above described problem (1) could occur.

In other words, even when the resolution is the same, the output destination can not be switched by only using software.

SUMMARY OF THE INVENTION

With the foregoing discussion in mind, it is one purpose of the present invention to provide an excellent screen display control method for controlling a screen of a display device (e.g., a liquid crystal display or a CRT display) that is employed for information processing apparatuses, such as personal computers, and to an excellent apparatus therefor.

It is another purpose of the present invention to provide a screen display control method for appropriately controlling a display screen when a changed output destination for a display signal is selected from among a plurality of display devices having different resolutions, and to an apparatus therefor.

It is an additional purpose of the present invention to provide a screen display control method by which an information processing apparatus can appropriately perform a screen display while employing a display device having any resolution, and to an apparatus therefor.

It is a further purpose of the present invention to provide a screen display control method by which the resolution of a display screen is dynamically changed, and an apparatus therefor.

BRIEF DESCRIPTION OF THE DRAWINGS

Some of the purposes of the invention having been stated, others will appear as the description proceeds, when taken in connection with the accompanying drawings, in which.

DESCRIPTION OF THE PREFERRED EMBODIMENT(S)

Figure 1:
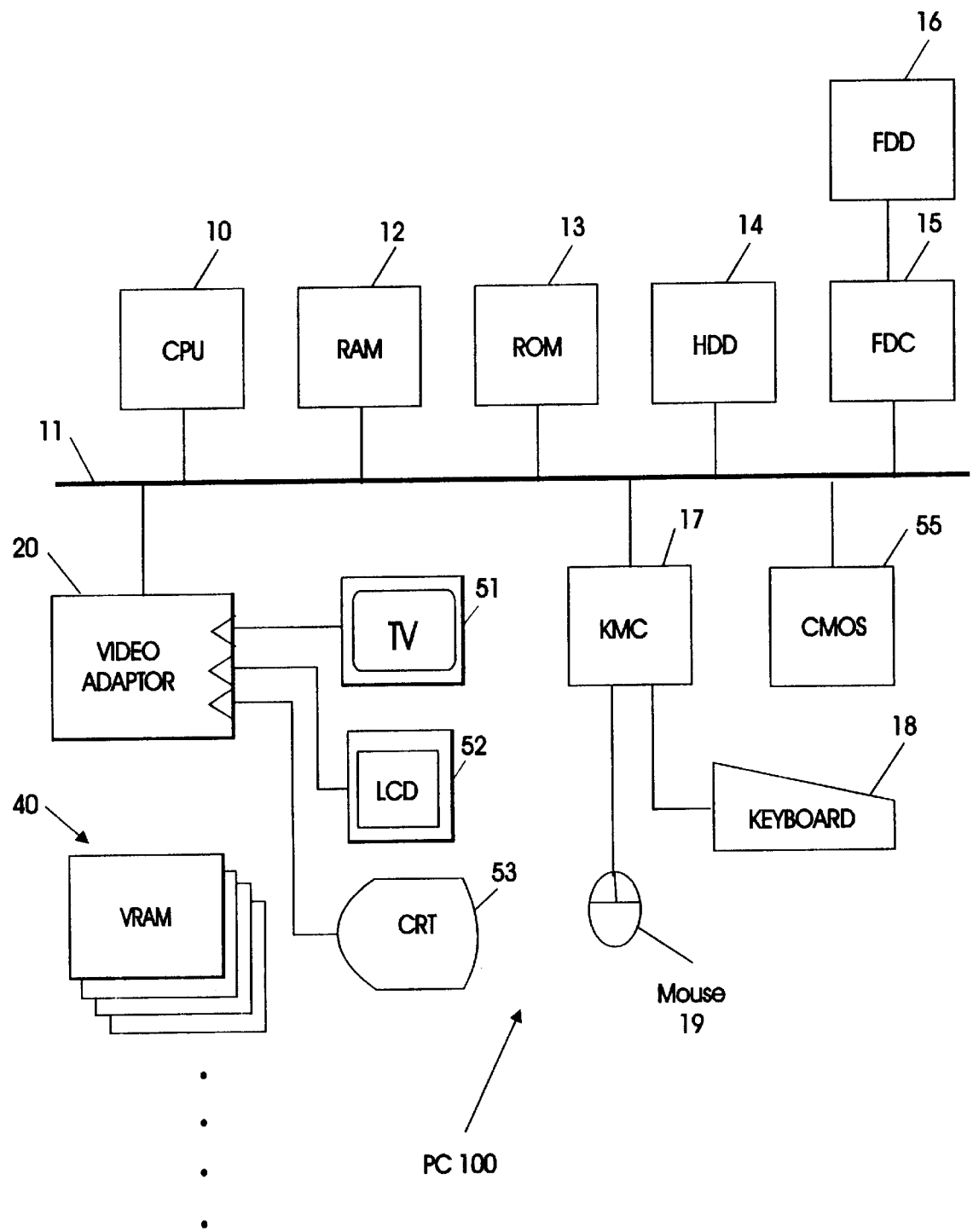
FIG. 1 is a schematic diagram illustrating the hardware arrangement of a PC 100 according to one embodiment of the present invention.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

To achieve the purposes stated above, according to a first aspect of the present invention, a screen display control method, for switching a display signal output destination between a plurality of display devices connected to an information processing apparatus, comprises: (a) a first resolution control step of examining a physical maximum resolution for each of the plurality of display devices that are connected to the information processing apparatus, and storing the examined physical maximum resolutions respectively; (b) a second resolution control step of determining a maximum resolution (maximum static resolution) that is used for the allocation of a screen buffer; (c) a selection step of designating one of the plurality of display devices as an display signal output destination in accordance with an instruction from a user; (d) a third resolution control step of determining a maximum resolution (maximum dynamic resolution) in accordance with a display ability of software for which a screen display is currently being performed; and (e) a resolution determination step of setting a physical resolution of the display device designated, at the step (c), as the display signal output destination, to a lower resolution of either the physical maximum resolution stored at the step (a) or the maximum dynamic resolution determined at the step (d).

According to a second aspect of the present invention, a screen display control apparatus, for switching a display signal output destination between a plurality of display devices that are connected to an information processing apparatus, comprises: (a) a CPU; (b) a main memory; (c) a video adaptor for outputting a display signal to at least one of a plurality of display devices that are connected; (d) input means at which a user enters an instruction for switching an output destination for the display signal from the video adaptor; (e) a screen buffer for temporarily storing image data; (f) first resolution control means for examining physical maximum resolutions for each of the plurality of display devices that are connected and for storing the physical maximum resolutions; (g) second resolution control means for setting a maximum resolution (a maximum static resolution) that is used for the allocation of the screen buffer; (h) third resolution control means for setting a maximum resolution (a maximum dynamic resolution) in accordance with a display ability of software for which a screen display is currently being performed; and (i) resolution determination means for setting a physical resolution for the display device that is newly designated as the output destination for display signal, in accordance with an instruction at the input means, to a lower resolution of either the physical maximum resolution stored by the first resolution control means or the maximum dynamic resolution set by the third resolution control means.

When an information processing apparatus is activated, an initial maximum dynamic resolution shall be set equal to a maximum static resolution.

At the second resolution control step/means, the maximum static resolution shall be determined in accordance with a screen display ability of an operating system that is booted by the information processing apparatus The maximum static resolution is the size of a "virtual screen" in a screen buffer formatted by an OS, such as Windows or OS/2, that displays a window screen (more specifically, a display driver of the OS formats the screen buffer, which will be described later).

At the third resolution control step/means, the maximum dynamic resolution shall be determined in accordance with whether or not the display screen for the running software is a full screen session. In other words, the maximum dynamic resolution is dynamically determined in accordance with whether a current display screen is a window screen of Windows or OS/2, or a full screen session with a lower resolution than that of the window screen.

According to the second aspect of the present invention, the input means, at which a user enters an instruction for switching the display signal output destination, may be a keyboard. The first resolution control means for examining and storing the physical maximum resolutions of the individual connected display devices can be embodied by the a predetermined codes of a BIOS (interface (1a) which will be described later) executed by the CPU. The second resolution control means for determining the maximum static resolution can also be embodied by a predetermined codes of the BIOS (interface (1b) which will be described later) executed by the CPU. The third resolution control means for determining the maximum dynamic resolution can be embodied by a predetermined codes of the BIOS (interface (1c) which will be described later) executed by the CPU. The resolution determination means for determining a physical resolution for the designated display device can be embodied by a predetermined codes of the BIOS (interface (1d) which will be described later) executed by the CPU. The BIOS is a basic operation command group for performing system hardware operations (which will be described later), and are permanently stored in a ROM (Read Only Memory), for example. From "Description of the Preferred Embodiments" it will become more obvious how the components of the present invention are mounted in an actual apparatus.

To appropriately implement the individual aspects of the present invention, the ROM of a computer need only have a software interface as one part of BIOS codes, which is equivalent to, for example, the following pseudo code:

```
function switching_of_display_device (output_destination_after_switching){
    switch (output_destination_after_switching) {
        case LCD:
            resolution_after_switching=Min(maximum_dynamic_resolution, LCD_resolution);
            break;
        case CRT display:
            resolution—after—switching=Min(maximum_dynamic_resolution, CRT_resolution);
            break;
        case TV monitor:
            resolution_after_switching=Min(maximum_dynamic_resolution, TV_resolution);
            break;
        case LCD+CRT display: /* simultaneous display */
            resolution_after_switching=Min(maximum_dynamic_resolution, LCD_resolution, CRT_resolution);
            break;
        case LCD+TV monitor: /* simultaneous display */
            resolution_after_switching=Min(maximum_dynamic_resolution, LCD_resolution, TV_resolution);
            break;
    }
    switching_of_display_device (output_destination_after_switching);
    switching_of_resolution (resolution_after_switching); }:
    /* end of function */
```

According to a screen display control method and a screen display control apparatus of the present invention, when an output destination is changed to a higher resolution display device, for example, from an LCD to a CRT display, the resolution is dynamically changed to a higher resolution by the resolution determination means. When the output destination is switched to a lower resolution display device, for example, from the CRT display to the LCD, the resolution is dynamically changed to a lower resolution by the resolution determination means. Therefore, a display signal that exceeds the drive ability of the display device is never supplied to the designated display device, and damage to the hardware will not be incurred.

During the execution of a full screen session, even when either an LCD or a CRT display is selected as a display signal output destination, the low resolution (640×480 dots) is not changed. This is because the resolution determination means sets the resolution to a lower one from either the dynamic resolution or the physical resolution of a display device. When the full screen session closed, a window screen is displayed in accordance with the maximum_physical_resolution of the LCD or the CRT display.

Each time a window screen for Windows or OS/2 and a full screen session are switched, the third resolution determination means alters a maximum_dynamic_resolution and the physical resolution of a display device.

According to the present invention, therefore, a screen display control method and a screen display control apparatus can be provided that can appropriately control a screen display when a changed output destination for a display signal is selected from among a plurality of display devices having different resolutions.

The preferred embodiment of the present invention will now be described in detail while referring to the drawings.

FIG. 1 is a schematic block diagram illustrating the hardware arrangement of a PC (hereafter also referred to as a "system") 100 according to the embodiment of the present invention. The individual components will now be briefly explained.

In FIG. 1, a CPU 10, a main controller, executes various programs under the control of an operating system (OS). The CPU 10 also outputs a computer signal for screen display. The CPU 10 communicates with its peripheral devices along a common signal path (also called a bus) 11 that includes a data signal line, an address signal line and a control signal line. The CPU 10 can, for example, be a "Pentium/1xxMHz" sold by Intel Corp.

A RAM 12, which is a data writable volatile memory, is employed for loading various programs, such as an OS and applications, that the CPU 10 executes, and also serves as a working area for a program that is being executed.

A ROM 13 is a nonvolatile memory into which are written data that are determined during the manufacturing process, and is employed to permanently store predetermined codes. The codes that are stored in the ROM 13 are, for example, a test program (POST: Power On Self Test) that is executed when the system 100 is powered on, and a program (BIOS: Basic Input/Output System) that includes basic operation commands for operating hardware components, including a video adaptor 20 that will be described later.

A hard disk drive (HDD) 14 and a floppy disk drive (FDD) 16 are so-called auxiliary storage devices. A floppy disk controller 15 is a dedicated controller for the FDD 16.

A keyboard/mouse controller (KMC) 17 converts a matrix entered at a keyboard 18, or a coordinate value pointed at with a mouse 19, into a format that the operating system, can handle, and sends the resultant data to the bus 11.

A CMOS RAM 55 is a relatively small memory device with a CMOS structure. The CMOS RAM 55 is generally backed up by a coin battery (not shown), and is used to store data, such as system configuration data and a password, that must not be lost even when the system is powered off.

A video adaptor 20 is a peripheral device that converts a computer signal into a video signal and provides the video signal to a display device, such as an LCD 52, a TV monitor 51, or a CRT monitor 53. More specifically, the video adaptor 20 processes a drawing command sent by the CPU 10, and temporarily writes it to a frame buffer (VRAM) 40. The video adaptor 20 also reads image data from the frame buffer 40 synchronously with the scan timing of the display device, and converts the image data into a video signal and transmits it to the display device, such as the LCD 52 that is provided as a standard feature. In addition, the video adaptor 20 controls the resolution on a screen, the number of screen colors, and the display rate.

The frame buffer 40 is a storage medium for temporarily storing a screen that is drawn by currently running software, such as Windows, OS/2, or DOS. The frame buffer 40 consists of the number of planes (R, G, B, . . . ) that corresponds to the data volume for each dot. The dot size for one plane is sufficiently large for the maximum resolution permitted by the video adaptor 20, and is, for example, the 1280×1024 dots size that is equivalent to the CRT display 53 at the maximum resolution. The screen size defined in the frame buffer 40 depends on the currently executing software, and the maximum resolution that Windows and OS/2 can drive (i.e., the window screen size) is, for example, 1024× 768. Since the software screen drawn on the frame buffer 40 is not the one that is actually displayed on the display device 51, 52 or 53 (which will be described later), this screen is also called a "virtual screen".

The TV monitor 51, the LCD 52 and the CRT display 53 are display devices that can be connected to the system 100, or are provided as a standard installation. Ordinarily, a notebook PC has an LCD installed as a standard, and a desktop PC has a CRT display installed as a standard. Which display device is to be installed is merely a matter of design. The TV monitor 51 and the LCD 52 sometimes have a lower resolution than that of a virtual screen in the frame buffer 40. In this case, the video adaptor 20 retrieves from the virtual screen only an appropriate size to display. The display screens that are actually provided for the display devices 51, 52 and 53 are also called "real screens".

Most PCs that are currently sold on the market have hardware components that are equivalent to the blocks shown in FIG. 1. Although many other electric circuits, etc., are required for constituting a PC, they are well known to one having ordinary skill in the art, and as they do not relate to the subject of this invention, and no explanation for them will be given in this specification.

Figure 2:
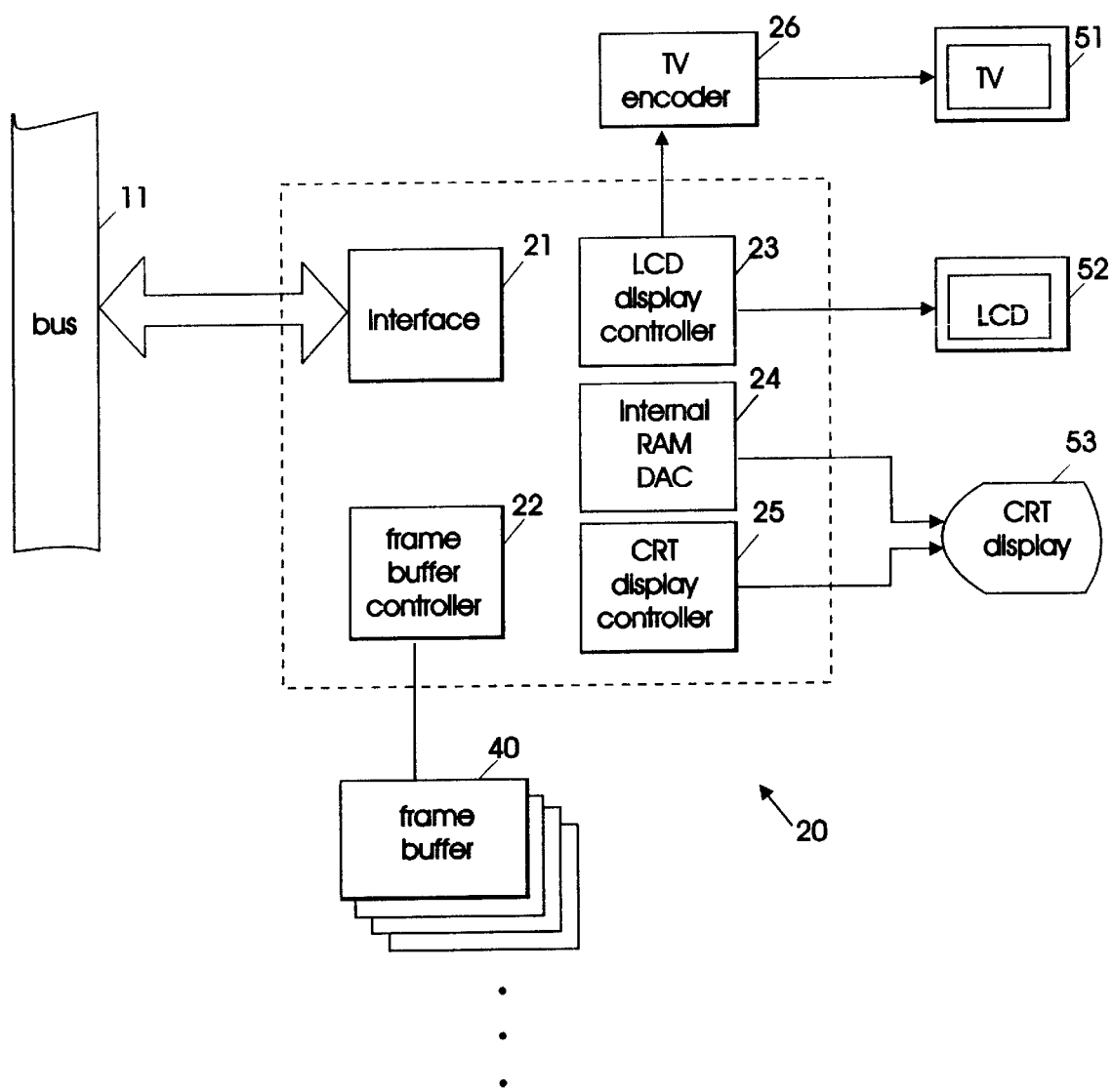
FIG. 2 is a block diagram illustrating a video adaptor 20 and its peripheral hardware components, which are employed for the PC 100 according to the embodiment of the present invention.

FIG. 2 is a detailed block diagram illustrating the video adaptor 20 and its periphery extracted from among the hardware components of the PC 100. The video adaptor 20 includes an interface 21, a frame buffer controller 22, an LCD display controller 23, an internal RAMDAC 24, and a CRT display controller 25. The video adaptor 20 also has output terminals from which video signals are transmitted to the TV monitor 51, the LCD 52, and the CRT display 53.

The interface 21 is electrically connected to the bus 11 to exchange data with the CPU 10. In other words, reception of commands from the CPU 10 and data exchange with the CPU are performed via the interface 21. The CPU 10 (more specifically, the BIOS that operates the video adaptor 20 hardware) accesses registers (not shown) in the interface 21 so as to set the resolution for a screen, the number of screen colors, and the display rate.

The frame buffer controller 22 controls the access (reading or writing) to the frame buffer 40. More specifically, the frame buffer controller 22 writes a virtual screen to the frame buffer 40, and retrieves a real screen from a virtual screen.

The LCD display controller 23 performs parallel to serial conversion of image data that are read from the frame buffer 40 to produce serial video signal, and transmits it to the LCD 52 at a display timing. The LCD display controller 23 is driven at such a timing that the size of one screen is either 640×400, 640×480, 800×600, or 1024×786, in accordance with the defined resolution.

A video signal is transmitted from the LCD display controller 23 to the TV monitor 51 or to the LCD 52. Since the TV monitor 51 is an NTSCIPAL system and has a different data format from the PC 100, a video signal decoded by a TV encoder 26 is transmitted to the TV monitor 51. The TV monitor 51 in this embodiment can display a screen of 640×480 dots at the maximum (this is for the NTSC system; for the PAL system, it is 800×600 dots). the maximum display screen size of the LCD 52 is one of 640×480 dots, 800×600 dots, or 1024×768 dots.

The internal RAMDAC 24 converts digital image data that are read from the frame buffer 40 into an analog video signal, and transmits it to the CRT display 53. The RAMDAC 24 has a color palette, and with this it can convert data into analog signals at high speed.

The CRT display controller 25 transmits a drive control signal for adjusting a display timing (e.g., a horizontal sync signal, hsync, or a vertical sync signal, vsync) to the CRT display 53. The CRT display controller 25 in this embodiment is driven at a timing that corresponds to the resolution defined according to the size of one screen is either 1024× 768 or 1280×1024.

The video signal output by the internal RAMDAC 24 and the drive control signal output by the CRT display controller 25 are transmitted to the CRT display 53. The maximum resolution for the CRT display 53 in this embodiment is either 1024×768 or 1280×1024.

The resolution on a display screen is controlled by the video adaptor 20 in accordance with a predetermined setup value, as is described above. When the system is powered on, the resolutions of the video adaptor 20, i.e., the resolutions that are provided by the LCD display controller 23 and the CRT display controller 25, are determined according to data written in the CMOS RAM 55. The LCD display controller 23 and the CRT display controller 25 control the corresponding display devices 51, 52 and 53 in accordance with the determined resolutions. In this embodiment, a special interface is provided in the BIOS, as will be described later, and the resolution that is defined in the video adaptor 20 can be dynamically changed by that interface.

VGA adapters (Video Graphics Array) and SVGA adapters (Super Video Graphics Array) are representative standard video adapters. It should be understood that the video adaptor 20 in this embodiment is an SVGA adaptor in which the resolutions and the number of colors are expanded beyond the VGA.

Figure 3:
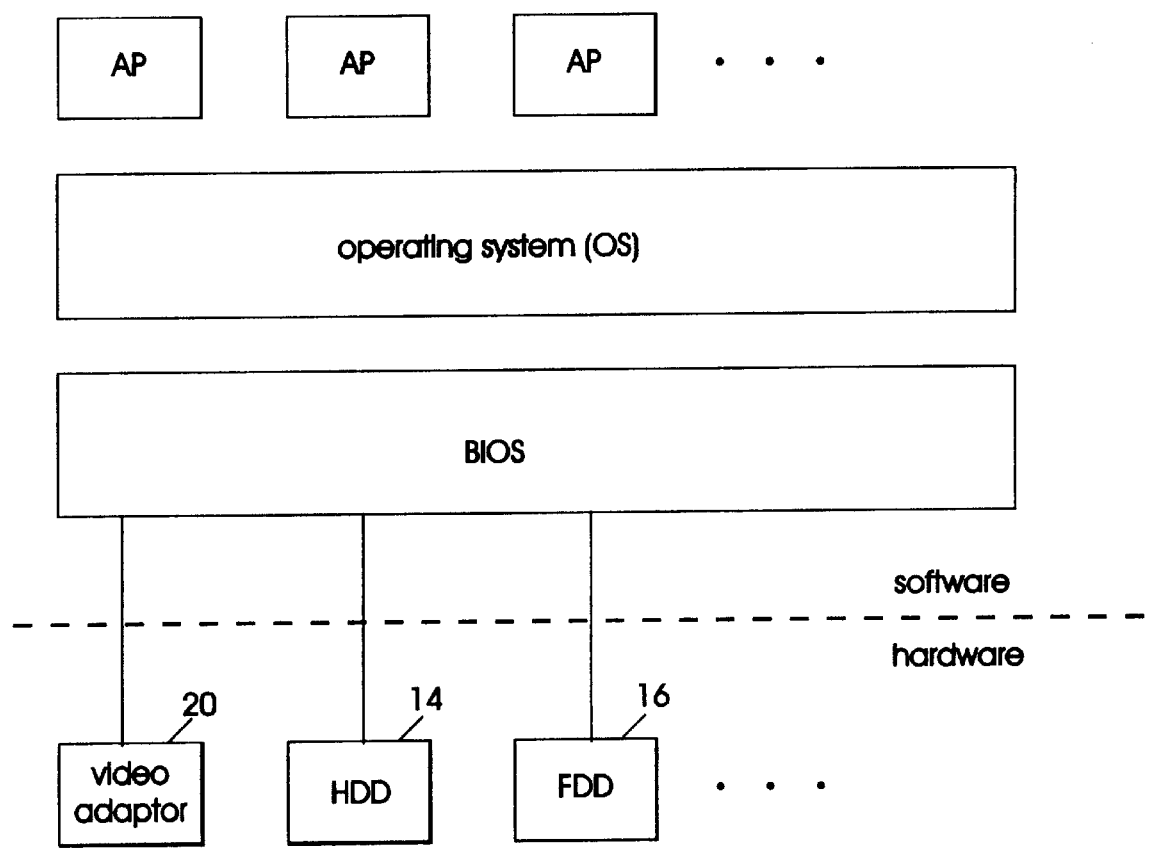
FIG. 3 is a diagram illustrating the software arrangement of the PC 100 according to the embodiment of the present invention.

FIG. 3 is a specific diagram illustrating the hierarchal structure of software that can be executed by the PC 100 according to the embodiment of the present invention.

The software in the lowest layer is a BIOS (Basic Input/Output System). The BIOS is a program group of basic operation commands for controlling the hardware components (the video adaptor 20, the keyboard 18, the HDD 14, the FDD 16, etc.) in the system 100, and upon the receipt of a call from upper layer software (e.g., the OS), performs the actual hardware operations. Generally, the BIOS is provided in advance during the manufacturing process, and is permanently stored in the ROM 13. The BIOS in this embodiment has a special software interface to properly implement the present invention, and this will be explained later in this description.

The operating system (OS) is a basic software program for the total management of the hardware and the software of the system 100, and is, for example, OS/2 or Windows. The OS includes a "file manager" for managing files in the HDD 14, a "scheduler" for managing the order in which tasks are to be executed by the CPU, and a "memory manager" for managing the allocation of memory. A "user interface" for performing a screen display and for operating a mouse is also included in the OS. A device driver, that is software of the type which will be added later for operating the hardware. For example, a "display driver" for driving the display device 51, 52 or 53, is a part of the OS.

The highest layer is an application program (AP). Software programs for word processing, database, chart calculation, and communication are examples of such APs. A utility program is also the AP. The APs are loaded as needed from the HDD 14 or the FDD 16 to the RAM 12 in accordance with the desires of a user.

To accomplish the present invention, the BIOS establishes the following interfaces (1a) through (1d).

(1a) Interface for determining maximum resolutions of individual display devices:

The interface (1a) reads the maximum resolutions for the display devices 51, 52 and 53 that are connected to the system 100, and stores them in its work area. These resolutions held in its work area are used for the following process (e.g., a process by the interface (1d)). The maximum resolution for the LCD 52 (hereafter referred to as the "LCD resolution") is identified by the "panel_ID" of the LCD 52. The maximum resolutions for the CRT display 53 and the TV monitor 51 (hereafter referred to as the "CRT resolution" and the "TV resolution", respectively) are written in advance in the CMOS RAM 55 by a predetermined utility program. Since the LCD 52 is installed as the standard, the LCD resolution is a fixed value. The contents in the CMOS RAM 55 will not be corrected unless the system 100 is rebooted after the utility program is activated. In other words, the CRT resolution and the TV resolution are fixed values while the system is continuing power-on state. Therefore, when the system 100 is activated, the interface (1a) need only access the panel_ID and the CMOS RAM 55 one time and write the resolutions in its work area.

(1b) Interface for determining the maximum resolution (maximum_static_resolution) that the running software can draw:

The interface (1b) is employed for determining the maximum_static_resolution. The maximum_static_resolution is that the running software, such as Windows or OS/2, can draw in the frame buffer 40. The maximum_static_resolution is equivalent to the dot size of a virtual screen.

The maximum_static_resolution at which the running software can draw is usually written in an INI file ("SYSTEM.INI" for Windows, and "OS2.INI" for OS/2), and can be acquired by reading the INI file when the operating system is booted. The access to the INI file is actually performed by the display driver in the OS. The interface (1b) performs the allocations for the frame buffer 40 according to the maximum_static_resolution indicated by the display driver, so that the physical size of a virtual screen is defined.

Once the size of a virtual screen is defined in the frame buffer 40, it will not be altered unless the system is rebooted and the INI file is accessed again. The maximum_static_resolution has such a static property that it is not changed during the operation of the system.

(1c) Interface for determining resolution with which a display can currently be drawn by software (maximum dynamic resolution):

The interface (1c) is employed for determining the resolution with which a display is currently possible by software.

The maximum_static_resolution determined the interface (1b) is equivalent to the allocations for the frame buffer 40, and is fixed at the time of initialization. Actually, however, the resolution with which a display is possible with software dynamically fluctuates in accordance with the software that draws a current screen display. For example, Windows and OS/2 can display a window screen at 1024× 768 dots, which is the same as the maximum_static_resolution (i.e., the virtual screen size). On the other hand, the full screen session is opened from a window screen for Windows (or for OS/2); however, its resolution is only 640×480 dots which is the screen display ability of the DOS. In other words, the resolution that can be currently provided by software actually fluctuates in accordance with whether a window screen for Windows (or for OS/2) or a screen for a full screen session is running.

Since the display driver exist within the OS, it can detect which screen is currently drawn in the frame buffer 40, either a window screen for Windows (or for OS/2) or a screen for a full screen session. The interface (1c) receives an instruction from the display driver, and physically defines a resolution that is currently possible with a display.

The setup of the resolution is actually performed dynamically and relatively often, because the window screen provided by Windows or OS/2 and the full screen session are switched with each other. In this specification, the resolution that is set by the interface (1c) is hereafter called the "maximum_dynamic_resolution" because of its dynamic property.

(1d) Interface for dynamically switching resolution in accordance with the selection of a display device:

The interface (1d) is employed to dynamically alter the resolution upon the event that the designated display device is switched. Pseudo code for this interface is as follows:

```
*****pseudo code*****
function switching_of_display_device (output_
    destination_after_switching) {
    switch (output_destination_after_switching){
    case LCD:
        resolution_after_switching=Min(maximum_dynamic_
resolution, LCD_resolution);
        break;
    case CRT display:
        resolution_after_switching=Min(maximum_dynamic_
resolution, CRT_resolution);
        break;
    case TV monitor:
        resolution_after_switching=Min(maximum_dynamic_
resolution, TV_resolution);
        break;
    case LCD+CRT display: /* simultaneous display */
        resolution_after_switching=Min(maximum_dynamic_
resolution, LCD_resolution,
        CRT_resolution);
        break;
    case LCD+TV monitor: /* simultaneous display */
        resolution_after switching=Min(maximum_dynamic_
            resolution, LCD_resolution,
        TV_resolution);
        break;
    }
    switching_of_display_device (output_destination_
after_switching);
        switching_of_resolution (resolution_after_switching);
    }: /* end of function */ **********
```

Parameter "output_destination_after_switching" in the above function "switching_of_display_device" can be designated by depressing the "Fn"key+"F7" key at the keyboard 18. In other words, by depressing the "Fn"+"F7" keys, a user can switch to another display device that is to be used as an output destination. The output_destination_after_switching can be changed each time when the "Fn"+"F7" keys are depressed. For example, when the "Fn"+"F7" keys are depressed one time while the LCD 52 is the selected output destination, the output_destination_after_switching can be changed to the CRT display 53. When the "Fn"+"F7" keys are depressed twice while the LCD 52 is the selected output destination, the output_destination_after_switching can be changed to the TV monitor 51.

The interface (1d) sets a new resolution for a newly designated output destination to a lower resolution, either a current maximum dynamic resolution or a physical maximum resolution for the selected display device (e.g., the LCD resolution). In this manner, the hardware of the display device will not be damaged, and the maximum resolution at which the currently running software can draw a screen can be determined.

To accomplish the present invention, the display driver in the OS (Windows or OS/2) includes the following process routines (2a), (2b) and (2c).
(2a) When OS is booted
(2a-1) Setup of maximum_static_resolution The display driver sets the maximum_static_resolution when the OS is booted. More specifically, when the OS is booted, the display driver accesses the INI file ("SYSTEM.INI" for Windows, and "OS2.INI" for OS/2). The OS reads the maximum resolution at which the running software can draw, and in accordance with this resolution, the display driver determines the maximum—static—resolution.

The maximum_static_resolution is determined by the display driver at the software level, and must be reflected physically. Therefore, the display driver calls the interface (1b) of the BIOS to permit it to format a virtual screen in the frame buffer 40, so that the maximum_static_resolution is also defined physically.
(2a-2) Setup of maximum_dynamic_resolution The display driver also determines the maximum_dynamic_resolution when the OS is booted.

As is described above, unlike the maximum_static_resolution defined at the initialization, the maximum_dynamic_resolution varies dynamically depending on whether a currently displayed screen is a window screen for Windows or OS/2, or a full screen session. The display driver in this embodiment provides the maximum_static_resolution as an initial value for the maximum_dynamic_resolution. With this value, screen display is begun. Since the maximum_dynamic_resolution at (2a-2) is determined only at the software level, the display driver calls the interface (1c) of the BIOS and also reflects it physically.
(2b) When a full screen session is opened Since the display driver exists in the OS, it can detect whether a current display screen is a window screen for Windows (or OS/2) or a full screen session. When a full screen session is opened from the window screen, the display driver employs the detection result and determines the maximum_dynamic_resolution to 640×480 dots, which is the screen display ability for DOS. Since the maximum_dynamic_resolution determined at this time is a software level, the display driver calls the interface (1c) of the BIOS to also reflect this resolution physically.
(2c) When a full screen session is completed Contrary to (2b), when a full screen session is terminated and a displayed screen is changed back to a window screen for Windows (or for OS/2), the resolution at which a display is possible at the software level is returned to 1024×768 dots, which is the same as the maximum_static_resolution. When the display driver detects that the displayed screen has been changed back to a window screen for Windows (or for OS/2), it again determines the maximum_dynamic_resolution to 1024×768 dots. This maximum_dynamic_resolution is a software level, and the display device calls the interface (1c) of the BIOS to also reflect the resolution physically.

The hardware and the software arrangements of a computer system that embodies the present invention have been described in the above. The operational characteristic of the hardware shown in FIG. 1 to FIG. 3 and the operation for dynamically switching the resolution for a display screen are now to be described.
When system 100 is powered on:

After the system 100 is powered on and the POST is performed, the interface (1a) of the BIOS determines the physical maximum resolutions (the LCD_resolution, the CRT_resolution, and the TV_resolution) for the display devices 51, 52 and 53 that are connected to the system 100. When the OS is booted, the display driver accesses the INI file ("SYSTEM.INI" for Windows and "OS2.INI" for OS/2) to determine the maximum_static_resolutions at the software level. Further, the display driver determines the maximum_dynamic_resolution, that is equal to the maximum_static_resolution at this time. When the booted OS is Windows or OS/2, the maximum_static_resolution and the initial maximum_dynamic_resolution are, for example, 1024×768 dots.

In order to physically reflect the maximum_static_resolution and the maximum_dynamic_resolution that are determined at the software level, the display driver calls the interfaces (1b) and (1c) in the BIOS. The interface (1b) performs an formatting of the frame buffer 40 in accordance with the indicated maximum_static_resolution, so that a virtual screen size is defined.

When the system 100 is a notebook PC, an LCD is provided therein as a standard feature:

Therefore, the initial maximum_static_resolution and the maximum_dynamic_resolution are, for example, 800×600 dots.

When an output destination is switched to a display device having a high resolution:

As previously described, a display device as an output destination is selected by depressing the "Fn"+"F7" keys. When "Fn"+"F7" keys are pressed once while the LCD 52 is the selected output destination, the new output destination after switching is the CRT display 53.

In this case, as the resolution_after_switching, the interface (1d) of the BIOS selects a lower resolution, either the current maximum_dynamic_resolution or the CRT_resolution. The maximum_dynamic_resolution is 1024×768 dots for a window screen for Windows (or for OS/2), and 640×480 dots for a full screen session. The CRT resolution is, for example, 1024×768 dots.

If a display is switched from the LCD to the CRT display when a window screen is displayed, the physical resolution of the CRT display after switching is reset to 1024×768 dots, and is not limited to the LCD resolution (800×600 dots) before switching. When a display is switched from the LCD to the CRT display while the display is for a full screen session, the physical resolution of the CRT display is reset to 640×480 dots in accordance with the display ability for DOS.

When an output destination is switched to a display device having a low resolution:

When the "Fn"+"F7" keys are depressed twice while the LCD 52 is the selected output destination, the new output destination after switching is the TV monitor 51 that has a lower maximum resolution. When the "Fn"+"F7" keys are depressed four times while the CRT display 53 is the selected output destination, the new output destination after switching is the LCD 52 that has a lower maximum resolution.

In the former case, as the resolution_after_switching, the interface (1d) of the BIOS selects a lower resolution, either the current maximum_dynamic_resolution or the_TV resolution. If the TV_resolution is, for example, 640×400 dots, the TV_resolution is lower than the dynamic resolution whether the output destination is switched during the display of the window screen or during the full screen session. The physical resolution of the TV monitor 51 after switching is determined to the minimum value of 640×400 dots. Therefore, a video signal that exceeds the drive ability of the TV monitor 51 is not selected and there is no risk of damaging the hardware.

In the latter case, as the resolution_after_switching, the interface (1d) of the BIOS selects a lower resolution, either the current maximum_dynamic_resolution or the LCD_resolution. If the display device is switched during a window screen display, the maximum_dynamic_resolution is 1024×768 dots, which is higher than the LCD_resolution, and the physical resolution of the LCD 52 is determined to the LCD_resolution. Therefore, a video signal that exceeds the drive ability of the LCD 52 is not selected and there is no risk of damaging the hardware. If the display device is switched during a full screen session display, the LCD_resolution exceeds the dynamic resolution, and the physical resolution of the LCD 52 after switching is unchanged, 640×480 dots.

In the same manner, when the output destination after switching is designated as the LCD 52, the LCD 52 and the CRT display 53 for a simultaneous display, or the LCD 52 and the TV monitor 51 for a simultaneous display, the interface (1d) of the BIOS determines the physical resolution after switching equal to the lowest resolution selected from among the physical_maximum_resolutions and the maximum_dynamic_resolutions for the designated display devices 51, 52 and 53. Therefore, video signals that exceed the drive abilities of the individual display devices 51, 52 and 53 are not selected and damage to hardware will not occur.

When a full screen session is opened and terminated:

When the display driver in the OS detects the open of a full screen session and its termination, it resets the maximum_dynamic_resolution at the software level. When a full screen session is opened, for example, the maximum_dynamic_resolution is determined to 640×480 dots. When the full screen session is terminated and the screen display is changed back to a window screen for Windows (or for OS/2), the maximum_dynamic_resolution is determined to 1024×768 dots.

The display driver further calls the interface (1c) of the BIOS and also defined the maximum_dynamic_resolution physically. In accordance with this setup, the resolutions of the display devices 51, 52 and 53 are changed.

The present invention has been described in detail while referring to a specific embodiment. However, it should be obvious to one having ordinary skill in the art that various modifications or revisions of the embodiment are possible within the scope of the present invention. That is, although the present invention has been disclosed by using an example, it should not be limited to that example. To fully understand the subject of the present invention, the claims should be referred to.

As is described above in detail, according to the present invention, provided are an excellent screen display control method for controlling a screen of a display device (e.g., a liquid crystal display or a CRT display) that is employed for information processing apparatuses, such as personal computers, and to an excellent apparatus therefor.

Further, according to the present invention, provided are a screen display control method for appropriately controlling a screen display when a changed output destination for a display signal is selected from among a plurality of display devices having different resolutions, and to an apparatus therefor.

In addition, according to the present invention, provided are a screen display control method by which an information processing apparatus appropriately performs a screen display on a display device having any resolution, and to an apparatus therefor.

Moreover, according to the present invention, provided are a screen display control method by which the resolution of a display screen is dynamically changed, and an apparatus therefor.

What is claimed is:

1. An information handling apparatus comprising:

(a) a CPU;

(b) a main memory in circuit communication with said CPU;

(c) a video adaptor in circuit communication with said CPU and said memory and outputting a display signal to at least one of a plurality of diverse physical display devices that are connected in circuit communication;

(d) an input device in circuit communication with said CPU at which a user enters an instruction for switching an output destination for said display signal from said video adaptor;

(e) a screen buffer in circuit communication with said memory and temporarily storing image data;

(f) a first resolution control in circuit communication with said CPU and which examines physical maximum resolutions for each of said plurality of display devices that are connected and stores data identifying said physical maximum resolutions;

(g) a second resolution control in circuit communication with said CPU and setting a maximum static resolution that is used for the allocation of said screen buffer;

(h) a third resolution control in circuit communication with said CPU and setting a maximum dynamic resolution in accordance with a display ability of software for which a screen display is currently being performed; and (i) a resolution setting circuit setting a physical resolution for a one of said diverse physical display devices that is newly designated as the output destination for said display signal, in accordance with an instruction at said input device, to a lower resolution of either the physical maximum resolution stored by said first resolution control or the maximum dynamic resolution set by said third resolution control.

2. An information handling apparatus according to claim 1, wherein, when the information handling apparatus is powered on, an initial maximum dynamic resolution is set equal to a maximum static resolution.

3. The information handling apparatus according to claim 1, wherein said second resolution control means determines the maximum static resolution in accordance with a screen display ability of an operating system that is booted by said information handling apparatus.

4. The information handling apparatus according to claim 1, wherein said third resolution control means determines the maximum dynamic resolution in accordance with whether or not the display screen of the running software on said information handling apparatus is a full screen session.

* * * * *